United States Patent
Joy et al.

(10) Patent No.: US 7,204,072 B2
(45) Date of Patent: Apr. 17, 2007

(54) MECHANICAL PRUNER

(75) Inventors: James Joy, Fredonia, NY (US); James Bedient, Branchport, NY (US)

(73) Assignee: National Grape Cooperative, Inc., Westfield, NY (US)

( * ) Notice: Subject to any disclaimer, the term of this patent is extended or adjusted under 35 U.S.C. 154(b) by 0 days.

(21) Appl. No.: 10/890,643

(22) Filed: Jul. 14, 2004

(65) Prior Publication Data

US 2005/0193709 A1    Sep. 8, 2005

Related U.S. Application Data

(63) Continuation of application No. 10/780,913, filed on Feb. 17, 2004.

(51) Int. Cl.
    *A01G 3/04*    (2006.01)
(52) U.S. Cl. ............................. 56/233; 56/234; 56/236; 56/328.1; 56/330
(58) Field of Classification Search .......... 56/233–236, 56/328.1, 330, 331, 340.1
    See application file for complete search history.

(56) References Cited

U.S. PATENT DOCUMENTS

| | | | | |
|---|---|---|---|---|
| 355,396 | A | * | 1/1887 | Hileman ...................... 56/236 |
| 1,555,398 | A | | 9/1925 | Brundert |
| 2,583,571 | A | * | 1/1952 | Howe .......................... 172/36 |
| 3,507,101 | A | | 4/1970 | Bernshausen |
| 3,596,457 | A | * | 8/1971 | Van Tine et al. ............. 56/330 |
| 4,383,400 | A | * | 5/1983 | Mead et al. .................. 56/233 |
| 4,777,787 | A | | 10/1988 | Warren |
| 4,989,365 | A | * | 2/1991 | Roger ..................... 47/1.01 R |
| 5,544,444 | A | | 8/1996 | Oldridge |
| 5,694,753 | A | * | 12/1997 | Dellinger ..................... 56/234 |
| 5,737,908 | A | * | 4/1998 | Andelfinger ................. 56/235 |
| 5,970,686 | A | | 10/1999 | Demarest |
| 5,970,689 | A | | 10/1999 | Hoffman et al. |
| 6,205,752 | B1 | | 3/2001 | Hess et al. |
| 6,374,538 | B1 | | 4/2002 | Morris et al. |
| 6,523,337 | B2 | * | 2/2003 | Spagnolo ..................... 56/234 |
| 6,634,162 | B1 | * | 10/2003 | Andros ...................... 56/328.1 |
| 2005/0039431 | A1 | * | 2/2005 | Schloesser et al. ........ 56/340.1 |

FOREIGN PATENT DOCUMENTS

DE    3510915 A1 * 10/1986

(Continued)

OTHER PUBLICATIONS

Special-T Farm & Equipment, Inc., Hartford Michigan, Advertisement for Friday Comberhedger.

*Primary Examiner*—Thomas B. Will
*Assistant Examiner*—Alicia Torres
(74) *Attorney, Agent, or Firm*—Hamilton, Brook, Smith & Reynolds, P.C.

(57) ABSTRACT

A mechanical pruner has a hinged trimming head that allows the trimming of grape vines growing on sloped ground. The trimming head has hedgers with forward facing cutting teeth and rotating combers that open up the grape vine canopy and pull the vines into the cutting path. By also allowing for multiple adjustments in the height of the pruner, lateral position of the trimming head, lateral position of the hedger relative to the trimming head, and both the lateral and vertical positions of the combers relative to the trimming head, the mechanical pruner provides a user with significant control over the trimming of grapevines.

25 Claims, 4 Drawing Sheets

FOREIGN PATENT DOCUMENTS

| | | | |
|---|---|---|---|
| DE | 3827381 A1 * | 2/1990 |
| DE | 3838703 A | 5/1990 |
| DE | 19936158 A1 * | 2/2001 |
| EP | 974262 A1 * | 1/2000 |
| FR | 2227816 A1 * | 5/1973 |
| FR | 2298269 A | 9/1976 |
| SU | 719556 A | 3/1980 |
| SU | 882477 B | 11/1981 |

* cited by examiner

MECHANICAL PRUNER

RELATED APPLICATION

This application continuation of U.S. application Ser. No. 10/780,913, filed Feb. 17, 2004. The entire teachings of the above application are incorporated herein by reference.

BACKGROUND OF THE INVENTION

Proper grooming of grapevines renders the vines more photosynthetically active and allows greater penetration of light into the fruit zone and lower buds. Increased light in the vine improves both fruit quality and productivity. In order to provide better sun penetration, vineyards are often slightly elevated above the surrounding land or planted on sloped grounds. Furthermore, sloped grounds may provide an opportunity for cold air to drain on one or two sides. Air drainage through and away from a vineyard not only reduces the danger from late-spring and early-fall frosts, but is important in the control of many grape diseases.

It has been recognized that the vines should be pruned each year so that a controlled growth results in the next growing season to provide a desired balance between the amount of foliage growth and the amount of fruit grown on the vines. Proper pruning is a selective process of reducing bud numbers while retaining premium quality fruiting buds on vine canes. If too many buds on the vine spurs remain after the pruning, there will be an excessive number of grape bunches formed. The vine will then put a relatively large amount of its energy into producing the fruit crop and a relatively small amount of its energy into vine and foliage growth. Since each leaf of the foliage supplies nutrients and energy from the sun to the plant, too little foliage will result in the vine having insufficient energy to produce the excessive fruit crop. As a consequence, the crop will have low sugar content and poor quality.

On the other hand, if too few buds are left, too great an amount of energy of the plant will go into producing foliage and growing vines. The fruit crop will have high sugar content and high quality, but the crop amount will be small. Proper pruning that provides a balance of foliage and crop growth with fruit buds will result in a maximum harvest of high quality grapes.

In the grape industry, a significant amount of grapevine pruning is done manually with scissor-like pruning shears. This is particularly true with respect to *Vitis labruscana* grapes (also known as 'Concord' and 'Niagra' grapes) which exhibit a drooping vine growth habit. The drooping vine growth of *Vitis labruscana* grapes creates a tangled canopy of vines that makes mechanical pruning difficult. Mechanical pruners have been developed because of the costs and difficulty in obtaining adequate hand labor to accomplish manual pruning in a timely manner. These mechanical pruners, however, typically have rigid or stationary hedgers that lack the control and precision of manual pruning.

SUMMARY OF THE INVENTION

The present invention provides a mechanical pruner for automatically pruning single curtain grapevines. More specifically, the present invention provides a mechanical pruner that possesses a high level of control and accuracy in pruning to establish a balance of foliage and crop growth to maximize harvest of high quality grapes.

In certain embodiments of the present invention, a vine cane pruner has a vertical support with a horizontal boom that extends from the top of the vertical support. The vertical support itself is mounted on a vehicle. A trimming head is located on a hinge at one end of the horizontal boom. The trimming head is hinged to rotate sideways either outward or inward along the front facing plane. A hedger with forwardly extended cutting teeth and a comber to draw vines into the path of the hedger are located on the trimming head for trimming the vines as the pruner moves along the same direction as the grape row. Where the mechanical pruner may be operated on rough and uneven ground, or where the grape rows may be planted on sloped ground, the trimming head can be adjusted to compensate for the changes in slope.

In an embodiment of the present invention, the trimming head has hydraulic cylinders that allow for automatic adjustment of the positioning of the trimming head on the hinge. The trimming head has a pair of hedgers and a corresponding pair of combers that straddle a row of grapevines as the pruner moves parallel to the row. The combers pull grapevines to free up the vine canopy from tangle, allowing the hedger teeth to engage along the direction of the pruner. The hedgers are hinged on the combing head to allow the hedgers to give way if they encounter a stationary object such as a trellis post.

Independent hydraulic cylinders allow for the control of the width of the hedgers and combers to allow for a close trimming of the grapevines where necessary. Further, the combers may be vertically adjusted to provide control over the pulling of grapevines into the hedger path. Hydraulic cylinders can be used to adjust the length of the vertical support, thus adjusting the height of the horizontal boom. For further control, hydraulic cylinders provide for control of the length of the horizontal boom, thus adjusting the distance of the trimming head from the vehicle.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
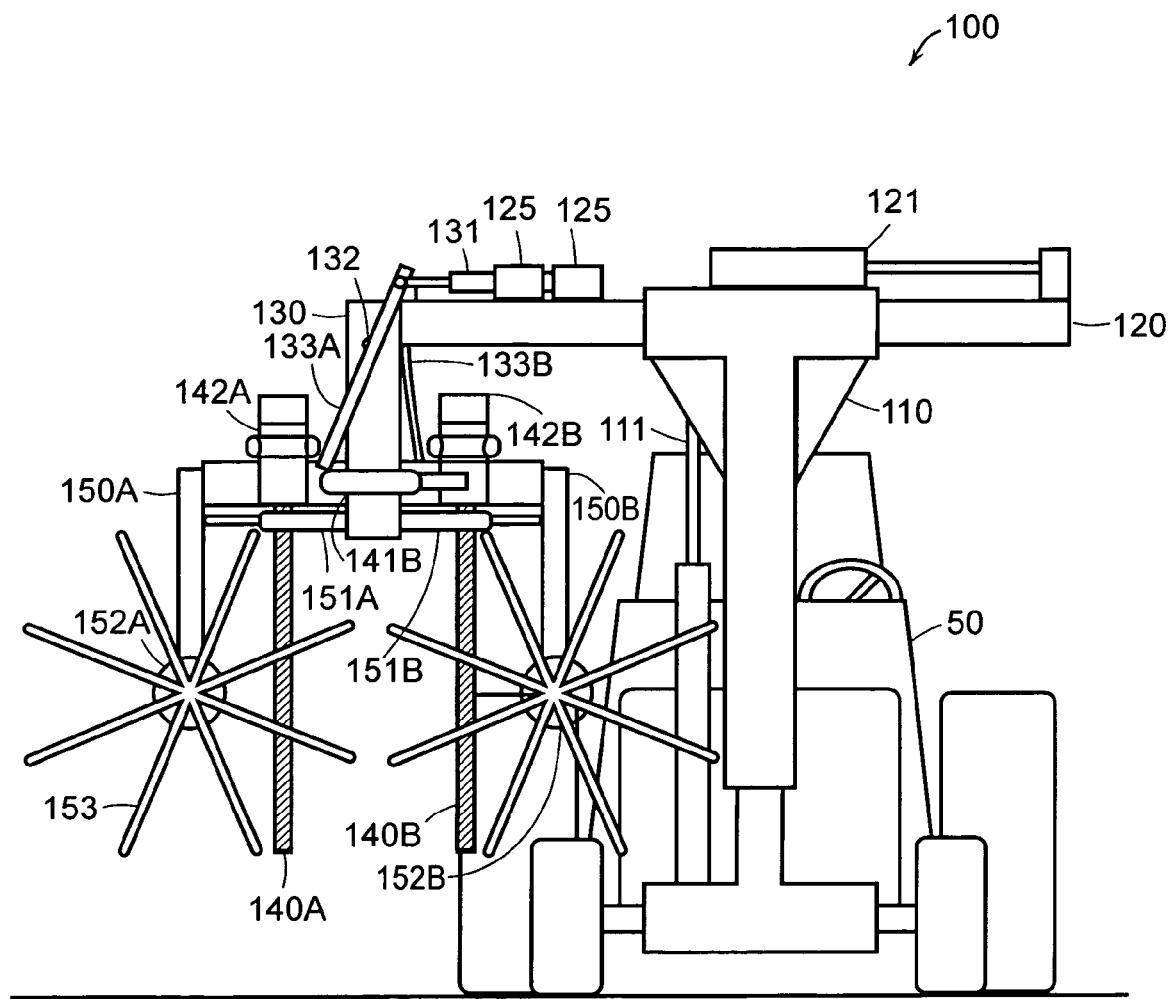
FIG. 1 is a front view of a mechanical vine cane pruner mounted on a vehicle.

FIG. 1 is a front view of an embodiment of a mechanical vine cane pruner 100 mounted on a vehicle 50 which an embodiment of the present invention may be deployed. The vine cane pruner includes a telescoping vertical support 110 having a "T" shape. A hydraulic cylinder 111 enables a user seated on the vehicle to adjust the height of the vertical support relative to the vehicle 50. A horizontal boom 120 passes through the top of the vertical support 110. A hydraulic cylinder 121 is connected to the horizontal boom 120, allowing for the horizontal boom 120 to telescope through the vertical support 110 to extend away from the vertical support 110.

On top of the horizontal boom 120 sit hydraulic solenoids 125 that connect various hydraulic cylinders to controls in the vehicle. The hydraulic hoses from the hydraulic cylinders to the solenoids have been omitted from the figure for clarity. Also on the horizontal boom 120 is a trimming head 130 that is located at the outward end of the horizontal boom.

The trimming head 130 extends downward from the horizontal boom 120 and is attached at hinge 132. A lever arm 133 connects the trimming head 130 to a hydraulic clyinder 131 that is positioned on top of the horizontal boom 120. Movement of the hydraulic cylinder 131 causes the trimming head 130 to rotate around the hinge 132. This rotation of the trimming head 130 occurs along the front facing plane. The rotation of the trimming head 130 allows the pruner 100 to adjust to changes in the slope of the vine growth, or to compensate for any uneven ground.

Figure 2:
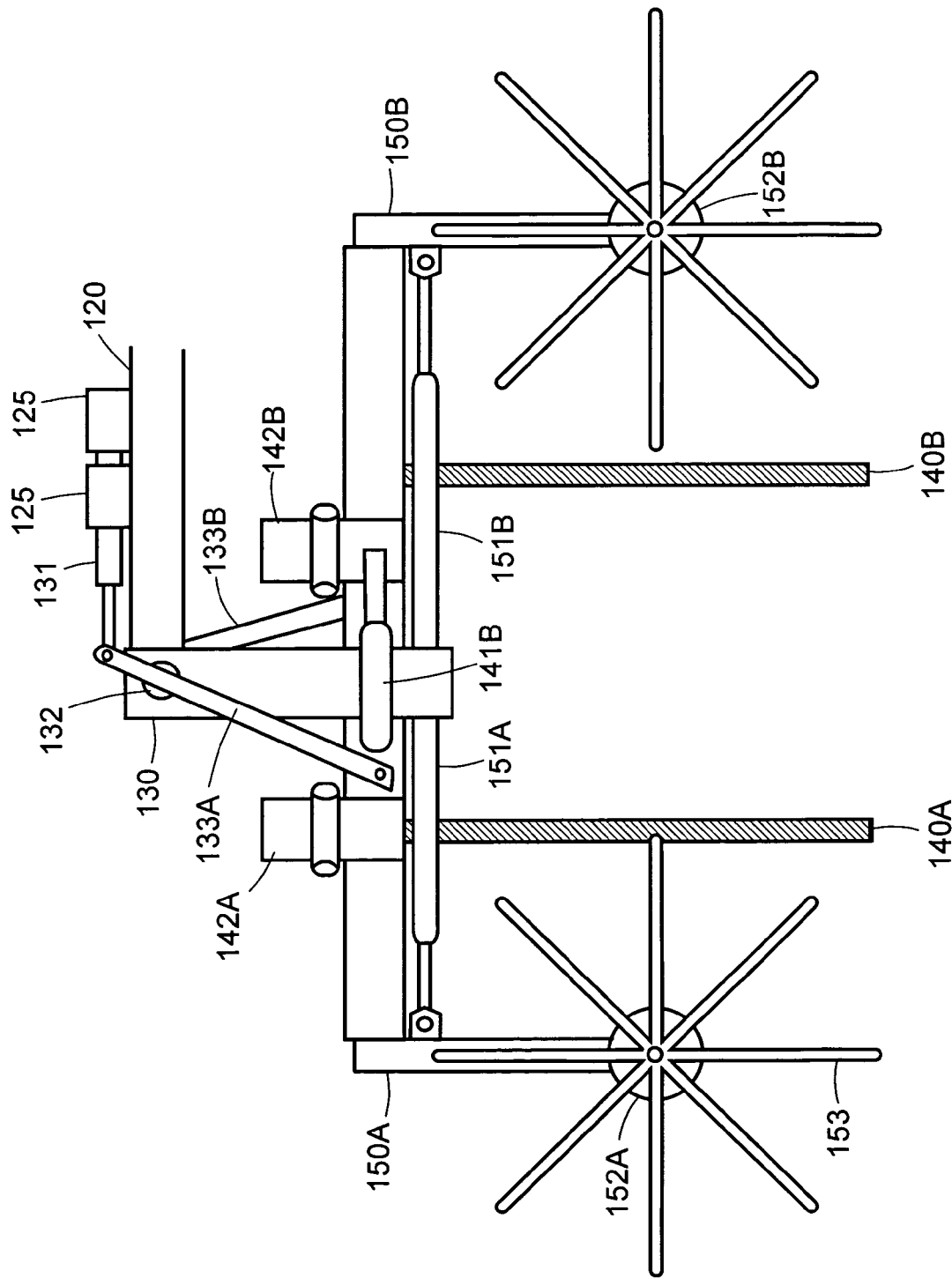
FIG. 2 is a more detailed front view of the trimming head of the mechanical vine cane pruner of FIG. 1.

FIG. 2 provides a more detailed view of a trimming head 130 on the hinge 132. On the trimming head 130 are a pair of downwardly extended hedgers 140A, 140B. Each hedger has plural forward facing teeth which are driven by hydraulic motors in a vertical reciprocating movement to cut the vines in a scissor action against fixed teeth. Each hedger is connected to the trimming head on adjustable mounts 142A, 142B. A hydraulic cylinder 141B provides lateral control of the position of one hedger 140B along the trimming head 130. On the rear side of the trimming head 130, FIG. 3, a second hydraulic cylinder 141A provides lateral control of the second hedger 140A independent from the first hedger 140B.

Also extending downward from the trimming head 130 are a pair of combers 150A, 150B that laterally telescope out of the trimming head 130. The distance between the two combers 150A, 150B can be controlled using hydraulic cylinders 151A and 151B. In operation, the hedgers 140A, 140B and combers 150A, 150B straddle a grape row, with a single hedger and corresponding comber located on each side of the row.

The combers 150A, 150B have rotating combing wheels 152A, 152B that have rotating rods or other extended members 153 that engage vines into the cutting path of the hedgers 140A, 140B. In an embodiment of the present invention the rods 153 are made of nylon to provide flexibility. Other materials, however can be used for the rods 153. The rotation of the combing wheels 152A, 152B is controlled by hydraulic motors 156A and can rotate either clockwise or counterclockwise in opposite direction to each other. This allows the combing wheels to rotate together inward to the grape row or outward. In addition, the hydraulic motor can be adjusted to vary the speed of the combers' rotation.

Figure 3:
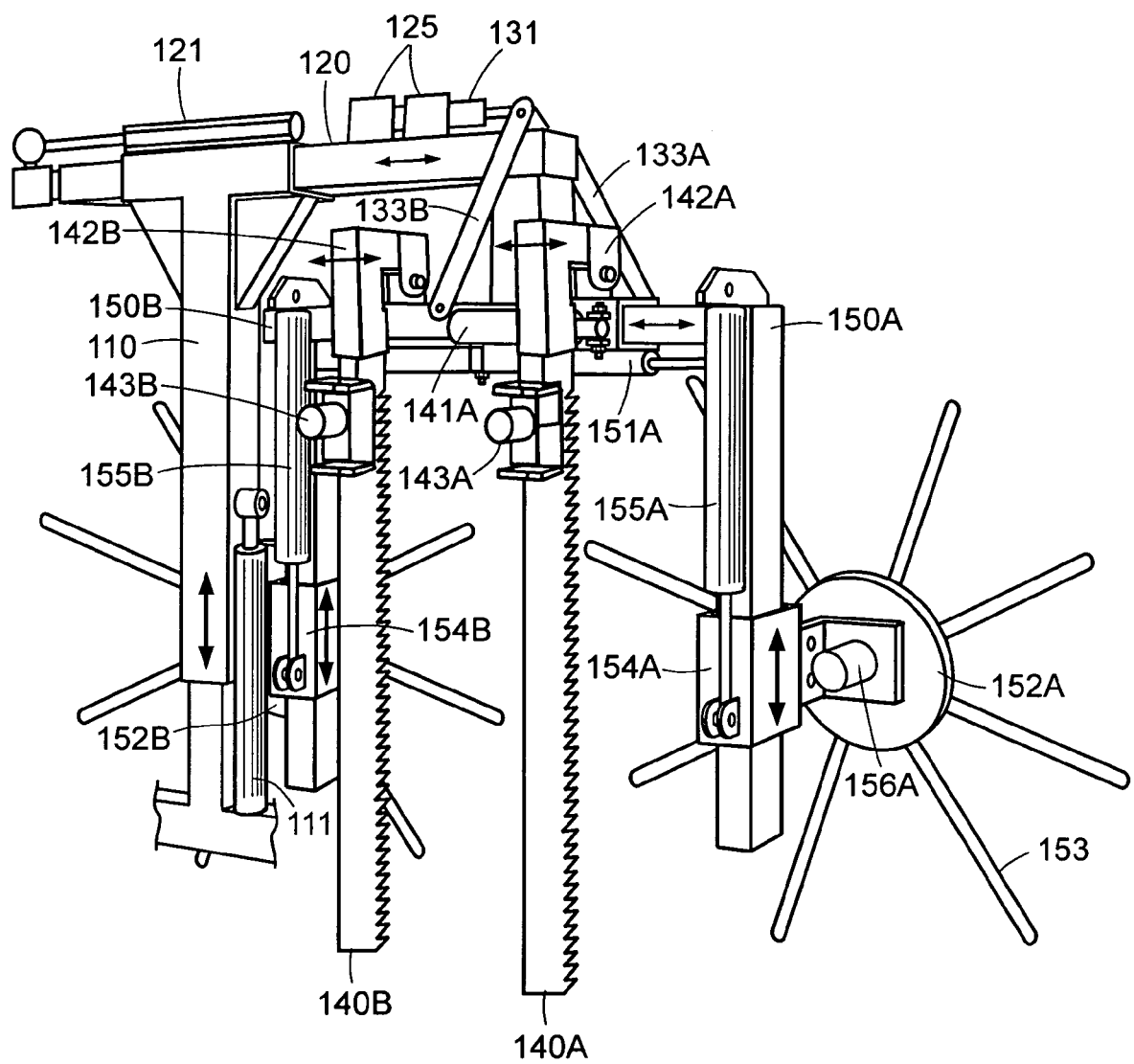
FIG. 3 is a detailed angled rear view of the mechanical vine cane pruner of FIG. 1.

FIG. 3 is a detailed angled rearview of the mechanical vine cane pruner of FIG. 1. As shown in FIG. 3, the comber wheels 152A, 152B are driven by hydraulic motors 156A and mounted on the combers 150A, 150B by a sliding mount 154A, 154B that is attached to a hydraulic cylinder 155A, 155B. The sliding mounts 154A, 154B allow the hydraulic cylinder 155A, 155B to control the vertical position of the comber wheels to provide added control for the user to free vines from the canopy. By freeing the vines, the hedger 140A, 140B has access to prune them.

The hedgers 140A, 140B are driven by hydraulic motors 143A, 143B and mounted on hinges 142A, 142B to allow the hedgers to swing back should the hedgers encounter a stationary object that might damage or disrupt the hedgers. The flexibility provided by the hinges 142A, 142B prevents the hedgers 140A, 140B from inadvertently breaking upon contact with a large stationary object such as a trellis post or with a grape vine, or in the event the hedgers become tangled within a dense growth of vines.

Figure 4:
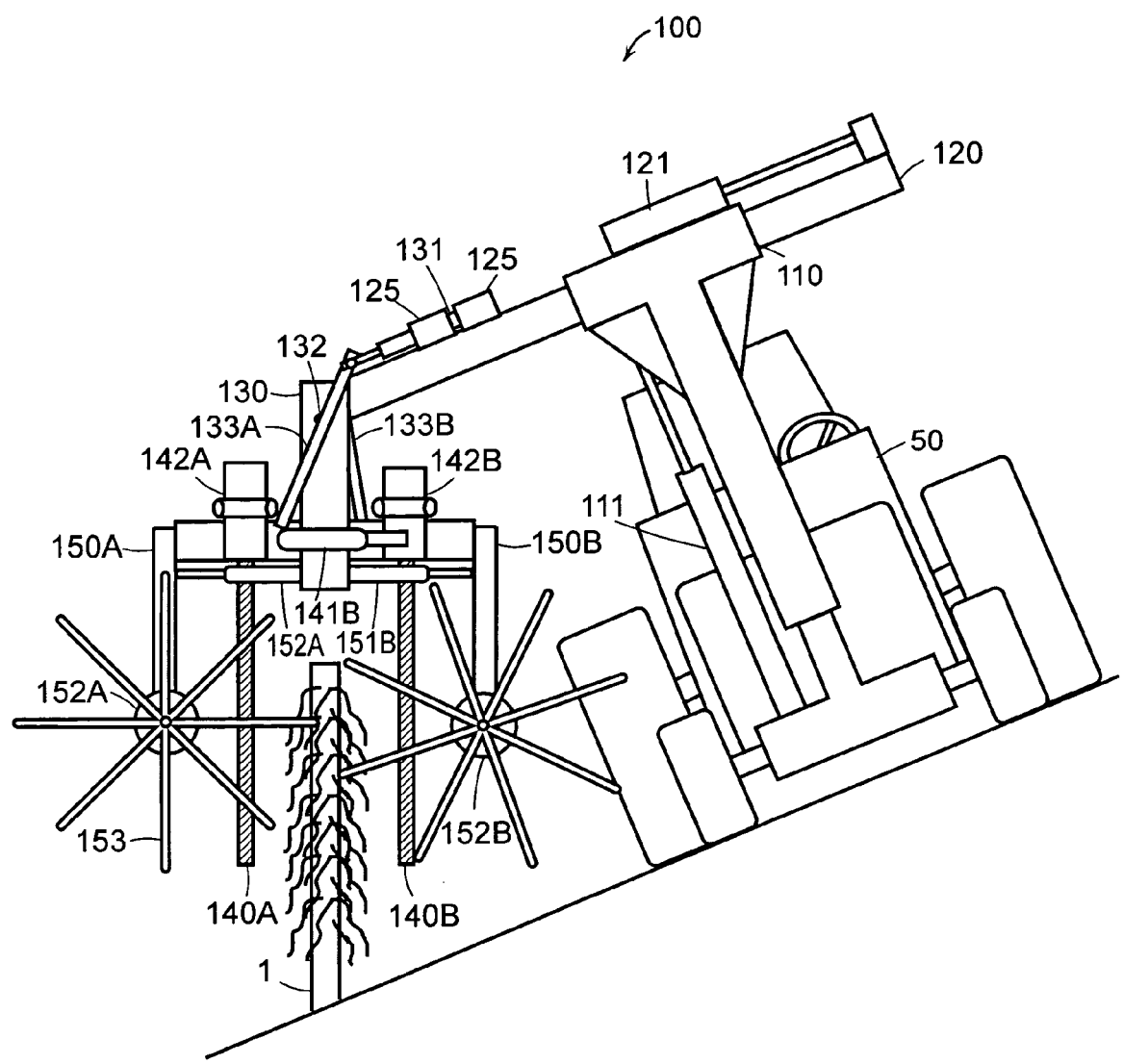
FIG. 4 is a front view of the mechanical vine cane pruner of FIG. 1 operating on a vine cane growing on a slope.

FIG. 4 shows the embodiment of the mechanical vine cane pruner of FIG. 1 as it operates on a vine cane growing on a slope. The hydraulic cylinder 131 contracts, thus pulling the trimming head levers 133A and 133B so as to rotate the trimming head 130 along the axis of the hinge 132. The angle of the trimming head 130 can be adjusted to compensate for changes in the slope of the grape rows. The combers 150A, 150B and the hedgers 140A, 140B straddle the grape row 1. The width of the hedgers 140A, 140B can be adjusted using controls of the hydraulic cylinders 141A, 141B. This allows for control over how closely the pruner cuts the vines from the cane.

The height of the trimmer head can be adjusted by using a hydraulic cylinder 111 to extend the vertical support 110 of the pruner. In addition, the distance between the grape row 1 and the vehicle 50 can also be adjusted by using a hydraulic cylinder 121 to telescope the horizontal boom 120.

In operation, the mechanical pruner 100 travels along the grape row 1, with the combers 150A, 150B straddling the grape row, and the hedgers 140A, 140B following. The rods 153 of the rotating comber wheels 152A, 152 B engage the vines of grape row 1 to open up the vine canopy to free the vines up for hedgers 140A, 140B to cut. In addition to controlling the width between the hedgers, the width between the combers 150A, 150B can be independently adjusted to allow a varying range of pruning distances between the combed vines and the hedgers 140A, 140B. Further, the mechanical pruner allows for the vertical adjustment of the comber wheels 152A, 152B to allow for the better control over the freeing of vines from the grape canopy. Using hydraulic solenoids, all the hydraulic adjustments can be made from the seat of the vehicle.

While this invention has been particularly shown and described with references to preferred embodiments thereof, it will be understood by those skilled in the art that various changes in form and details may be made therein without departing from the scope of the invention encompassed by the appended claims.

What is claimed is:

1. A vine cane pruner comprising:
   a vertical support to be mounted to a vehicle;
   a horizontal boom that extends from the top of the vertical support;
   a trimming head supported from the horizontal boom, the trimming head configured to pivot relative to the boom;
   a pair of hedgers extended and displaced vertically downward from the trimming head, the hedgers having cutting teeth forwardly extended and configured to straddle an entire grape vine, the cutting teeth reciprocating vertically; and
   a pair of combers independently mounted on the trimming head ahead of the hedgers, the comber having moving members that are driven to rotate along a plane substantially perpendicular to the pruner's direction of travel and engage vines to draw the vines away from a vine cane.

2. A pruner as claimed in claim 1 wherein the trimming head connects to a hydraulic cylinder fixed on the horizontal boom, the hydraulic cylinder rotating the trimming head along a hinge and holding the position of the trimming head.

3. A pruner as claimed in claim 2 wherein the position of each hedger on the trimming head is laterally adjustable.

4. A pruner as claimed in claim 3 wherein each hedger has a hydraulic cylinder that laterally adjusts the position of each hedger.

5. A pruner as claimed in claim 2 wherein the position of each comber on the trimming head is laterally adjustable.

6. A pruner as claimed in claim 5 wherein each comber has a hydraulic cylinder that laterally adjusts the position of each comber.

7. A pruner as claimed in claim 2 wherein the position of each comber on the trimming head is vertically adjustable.

8. A pruner as claimed in claim 7 wherein each comber has a hydraulic cylinder that vertically adjusts the position of each comber.

9. A pruner as claimed in claim 2 wherein the length of the vertical support is adjustable.

10. A pruner as claimed in claim 9 wherein the vertical support has a hydraulic cylinder that adjusts the length of the vertical support.

11. A pruner as claimed in claim 2 wherein the horizontal boom is outwardly extended.

12. A pruner as claimed in claim 11 wherein the horizontal boom has a hydraulic cylinder that outwardly extends the horizontal boom.

13. A vine cane pruner comprising:
a vehicle;
a vertical support mounted on the vehicle, the vertical support having a hydraulic cylinder that adjusts the height of the vertical support;
a horizontal boom that extends from the top of said vertical support, the horizontal boom having a hydraulic cylinder that outwardly extends the horizontal boom;
a trimming head supported from the horizontal boom, the trimming head configured to pivot relative to the boom, where a hydraulic cylinder on the horizontal boom connects to the trimming head to control the rotation and hold the position of the trimming head;
a pair of hedgers extended and displaced vertically downward from the trimming head, the hedgers having cutting teeth forwardly extended and configured to straddle an entire grape vine, the cutting teeth reciprocating vertically, and hydraulic cylinders that independently adjust the horizontal position of the hedgers on the trimmer head; and
a pair of combers independently mounted on the trimming head, the combers having moving members that are driven to rotate along a plane substantially perpendicular to the pruner's direction of travel and engage vines to draw the vines away from a vine cane and hydraulic cylinders that independently adjust the horizontal and vertical position of the combers on the trimmer head.

14. A vine cane pruner comprising:
a vertical support to be mounted on a vehicle;
a horizontal boom that extends from the top of the vertical support;
a pair of hedgers supported by the boom and extended and displaced vertically downward, the hedgers having cutting teeth forwardly extended and configured to straddle an entire grape vine, the cutting teeth reciprocating vertically; and
a pair of combers independently mounted on the trimming head ahead of the hedgers and extended downward from the boom, the combers being vertically adjustable and having moving members that are driven to rotate along a plane substantially perpendicular to the pruner's direction of travel and engage vines to draw the vines away from a vine cane.

15. A pruner as claimed in claim 14 wherein each comber has a hydraulic cylinder that vertically adjusts the position of the combers.

16. A pruner as claimed in claim 15 wherein the position of each comber on the boom is laterally adjustable.

17. A pruner as claimed in claim 16 wherein each comber has a hydraulic cylinder that laterally adjusts the position of the combers on the boom.

18. A pruner as claimed in claim 15 wherein the length of the vertical support is adjustable.

19. A pruner as claimed in claim 18 wherein the vertical support has a hydraulic cylinder that adjusts the length of the vertical support.

20. A pruner as claimed in claim 15 wherein the horizontal boom is outwardly extended.

21. A pruner as claimed in claim 20 wherein the horizontal boom has a hydraulic cylinder that outwardly extends the horizontal boom.

22. A pruner as claimed in claim 15 wherein the position of each hedger on the boom is laterally adjustable.

23. A pruner as claimed in claim 22 wherein each hedger has a hydraulic cylinder that laterally adjusts the position of each hedger.

24. A pruner as claimed in claim 15 further comprising a trimming head supported by the horizontal boom for mounting the pair of hedgers and the pair of combers.

25. A vine cane pruner comprising:
a vehicle;
a vertical support to be mounted on the vehicle, the vertical support having a hydraulic cylinder that adjusts the height of the vertical support;
a horizontal boom that extends from the top of the vertical support, the horizontal boom having a hydraulic cylinder that outwardly extends the horizontal boom;
a trimming head supported from the horizontal boom;
a pair of hedgers extended and displaced vertically downward from the trimming head, the hedgers having cutting teeth forwardly extended and configured to straddle an entire grape vine, the cutting teeth reciprocating vertically, and having hydraulic cylinders that independently adjust the horizontal position of the hedgers on the trimmer head; and
a pair of combers independently mounted on the trimming head ahead of the hedgers and extended downward from the trimming head, the combers having moving members that are driven to rotate along a plane substantially perpendicular to the pruner's direction of travel and engage vines to draw the vines away from a vine cane and hydraulic cylinders that independently adjust the horizontal and vertical position of the combers on the trimmer head.

* * * * *